United States Patent
Tan et al.

(10) Patent No.: US 12,523,897 B2
(45) Date of Patent: Jan. 13, 2026

(54) ELECTRONIC DEVICE

(71) Applicant: InnoLux Corporation, Miao-Li County (TW)

(72) Inventors: Jin-Yi Tan, Miao-Li County (TW); Hong-Sheng Hsieh, Miao-Li County (TW); Chih-Yung Hsieh, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 71 days.

(21) Appl. No.: 18/407,796

(22) Filed: Jan. 9, 2024

(65) Prior Publication Data

US 2024/0272462 A1    Aug. 15, 2024

(30) Foreign Application Priority Data

Feb. 9, 2023    (CN) .......................... 202310105737.9

(51) Int. Cl.
*G02F 1/13* (2006.01)
*G02F 1/133* (2006.01)
*G02F 1/1335* (2006.01)
*G02F 1/29* (2006.01)
*G02F 1/1334* (2006.01)

(52) U.S. Cl.
CPC ........ *G02F 1/1323* (2013.01); *G02F 1/13306* (2013.01); *G02F 1/133562* (2021.01); *G02F 1/133567* (2021.01); *G02F 1/29* (2013.01); *G02F 1/1334* (2013.01)

(58) Field of Classification Search
CPC ............... G02F 1/1323; G02F 1/13306; G02F 1/133562; G02F 1/133567; G02F 1/29; G02F 1/1334
See application file for complete search history.

(56) References Cited

U.S. PATENT DOCUMENTS

| | | | | |
|---|---|---|---|---|
| 10,663,776 | B1 * | 5/2020 | Hopkin | G02B 6/0031 |
| 11,320,705 | B2 * | 5/2022 | Wang | G02F 1/134309 |
| 11,754,867 | B1 * | 9/2023 | Chao | G02F 1/133345 |
| | | | | 349/139 |
| 11,796,843 | B2 * | 10/2023 | Chen | G02F 1/1323 |

(Continued)

FOREIGN PATENT DOCUMENTS

| CN | 108803113 B | 11/2021 |
|---|---|---|
| TW | 202122878 A | 6/2021 |

OTHER PUBLICATIONS

Chinese language office action dated Sep. 25, 2025, issued in application No. TW 112117899.

*Primary Examiner* — Ibrahim A Khan

(74) *Attorney, Agent, or Firm* — McClure, Qualey & Rodack, LLP

(57) ABSTRACT

An electronic device is provided. The electronic device includes a substrate, a panel, an optical modulation layer, and a control unit. The panel includes a first region, a second region, and a third region between the first region and the second region. The optical modulation layer is disposed corresponding to the panel. The control unit is electrically connected to the panel. The control unit inputs a bright region voltage to the first region and the second region, and inputs a dark region voltage to the third region during a plurality of operation periods. The bright region voltage differs from the dark region voltage during any of the operation periods.

18 Claims, 8 Drawing Sheets

(56) References Cited

U.S. PATENT DOCUMENTS

| | | | |
|---|---|---|---|
| 11,892,728 B2* | 2/2024 | Hsieh | G02F 1/137 |
| 2017/0235188 A1* | 8/2017 | Large | G02F 1/13342 |
| | | | 349/68 |
| 2020/0049864 A1* | 2/2020 | Huang | G02B 5/003 |
| 2020/0201088 A1* | 6/2020 | Yao | G02F 1/1323 |
| 2021/0026194 A1* | 1/2021 | Jitsui | G02F 1/133567 |
| 2021/0055582 A1* | 2/2021 | Chen | G02F 1/13362 |
| 2022/0291547 A1 | 9/2022 | Hsieh | |

\* cited by examiner

ELECTRONIC DEVICE

CROSS REFERENCE TO RELATED APPLICATIONS

This application claims priority of China Patent Application No. 202310105737.9 filed on Feb. 9, 2023, the entirety of which is incorporated by reference herein.

BACKGROUND

Technical Field

The present disclosure relates to electronic devices, and in particular it relates to an electronic device with optical modulating function.

Description of the Related Art

With the continuous advancement of the application of electronic devices, the development of display technology is also changing with each passing day. However, in the face of different manufacturing technical conditions, the requirements for the structure and quality of electronic devices are getting higher and higher, so that the manufacturing of electronic devices faces different challenges. In the era of vigorous information development, people have begun to pay attention to the information security and privacy of screen use. The anti-peeping technical capabilities and convenience of the screen have become an important part of product features, and the demand for anti-peeping displays is also increasing.

Among numerous anti-peeping display technologies, when anti-peeping in a specific region of the plane is to be achieved, there will be an image distortion problem at the boundary of regions of the sharing (Share) mode and the anti-peeping (Privacy) modes. For example, when squinting at the anti-peeping region near the boundary, due to the influence of the oblique light from the shared region, the region that should be protected from peeping will be seen. On the other hand, when squinting at the shared region near the boundary, due to the absence of the oblique light, the region that should have been shared will not be visible.

Since there is a film layer, such as glass, polarizer, cavity, bonding glue, etc., with a certain thickness between the panel and the light control module, there is a difference between the images viewed from the front and the side, with a distortion occurs when viewing from a larger viewing angle. In the past technology, different modules are used to separate the shared region and the anti-peeping region, so as to avoid image distortion between the above-mentioned regions of different modes. However, this full-screen switching mode makes it impossible for public information and private information that needs to be protected from prying to coexist on the same screen, which limits some screen display applications in open spaces. To sum up, although the existing electronic devices can roughly meet their originally intended purposes, they still do not fully meet the needs in all aspects.

BRIEF SUMMARY

The present disclosure provides an electronic device. The electronic device includes a substrate, a panel, an optical modulation layer, and a control unit. The panel includes a first region, a second region, and a third region between the first region and the second region. The optical modulation layer is disposed so that it corresponds to the panel. The control unit is electrically connected to the panel. The control unit inputs a bright region voltage to the first region and the second region, and inputs a dark region voltage to the third region during a plurality of operation periods. The bright region voltage differs from the dark region voltage during any of the operation periods.

The present disclosure provides an electronic device. The electronic device has a first region, a second region, and a third region disposed between the first region and the second region. The electronic device includes a panel, an optical modulation layer, and a control unit. The panel emits an emitted light corresponding to the first region and the second region. The optical modulation layer is disposed so that it corresponds to the panel and has a first portion and a second portion that are connected to each other. The control unit is electrically connected to the panel. The third region has a first sub-region overlapping the first portion and a second sub-region overlapping the second portion. A first modulated light from the first portion has a first brightness viewing angle, and a second modulated light from the second portion has a second brightness viewing angle. The first brightness viewing angle is smaller than the second brightness viewing angle.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion

DETAILED DESCRIPTION

Figure 1A:
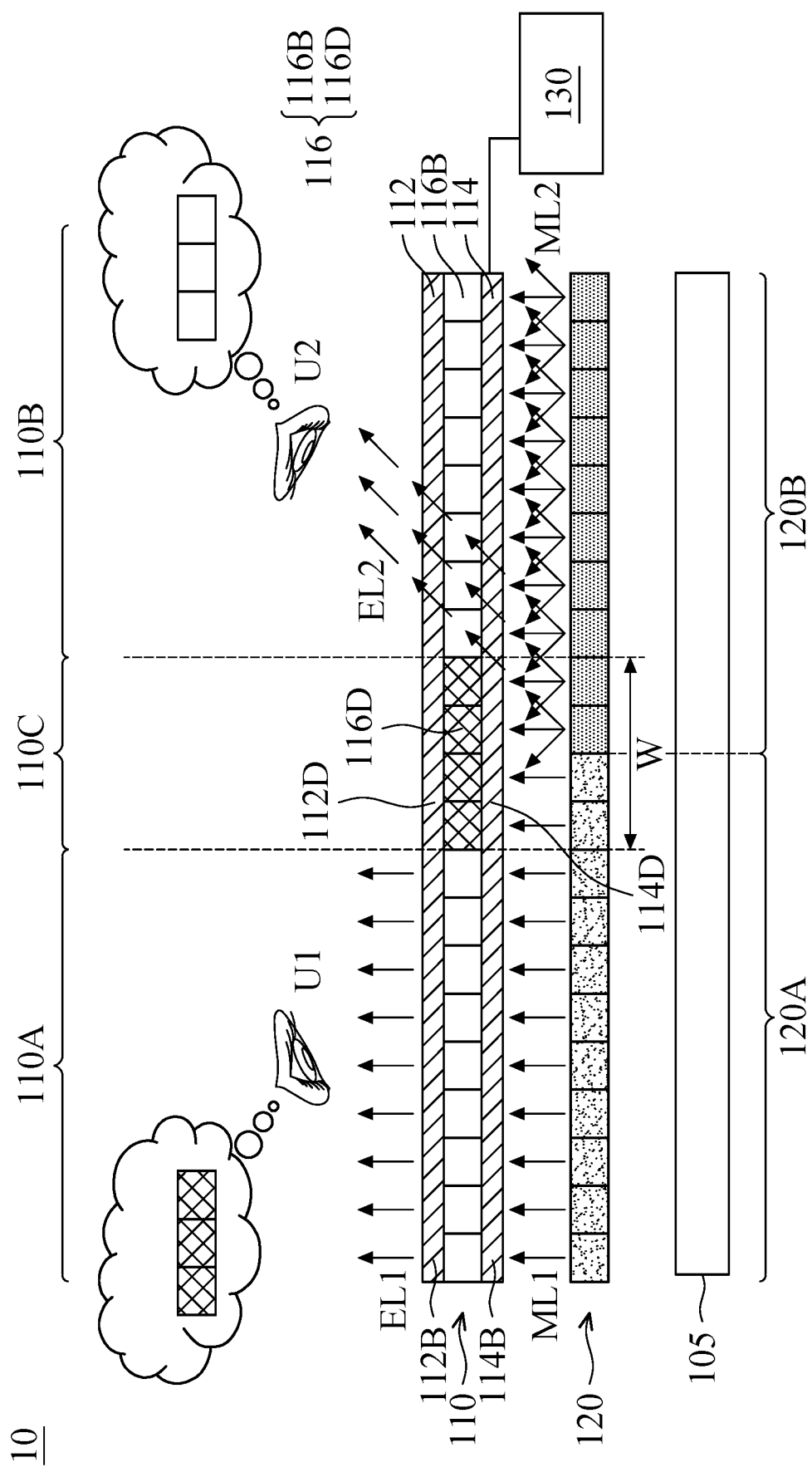
FIG. 1A illustrates a cross-sectional view of an electronic device with a panel disposed over an optical modulation layer, in accordance with some embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Unless otherwise defined, all terms (including technical and scientific terms) used herein have the same meaning as commonly understood by those skilled in the art to which this disclosure belongs. It can be understood that these terms, such as those defined in commonly used dictionaries, should be interpreted as having meanings consistent with the background or context of the related technology and the present disclosure, and should not be interpreted in an idealized or overly formal manner, unless otherwise specified in the disclosed embodiments.

The terms "about", "approximately", and "substantially" used herein generally refer to a given value or a range within 20 percent, preferably within 10 percent, and more preferably within 5 percent, within 3 percent, within 2 percent, within 1 percent, or within 0.5 percent. It should be noted that the amounts provided in the specification are approximate amounts, which means that even "about", "approximate", or "substantially" are not specified, the meanings of "about", "approximate", or "substantially" are still implied.

It should be understood that the following embodiments can replace, combine, and reorganize features in several different embodiments to complete other embodiments without departing from the spirit of the present disclosure. As long as the features of the various embodiments do not violate the spirit of the invention or conflict, they can be recombined and used arbitrarily.

Some embodiments of the disclosure are described. Additional operations can be provided before, during, and/or after the stages described in these embodiments. Some of the stages that are described can be replaced or eliminated for different embodiments. Additional features can be added to the semiconductor device structure. Some of the features described below can be replaced or eliminated for different embodiments. Although some embodiments are discussed with operations performed in a particular order, these operations may be performed in another logical order.

The term "substantially" as used herein indicates the value of a given quantity that can vary based on a particular technology node associated with the subject semiconductor device. In some embodiments, based on the particular technology node, the term "substantially" can indicate a value of a given quantity that varies within, for example, ±10% of a target (or intended) value.

It should be understood that the electronic device of the present disclosure may include a semiconductor device, a semiconductor packaging device, a display device, a radar device, a LIDAR device, an antenna device, a touch display device, a curved display device or a non-rectangular display device (free shape display), but not limited to this. The electronic device may be a bendable or flexible electronic device. The electronic device may include, for example, but not limited to, light-emitting diodes, liquid crystals, fluorescence, phosphors, other suitable display media, or a combination thereof. The light-emitting diodes may include, for example, organic light-emitting diodes (OLEDs), inorganic light-emitting diodes (LEDs), mini-light-emitting diodes (mini LEDs), micro-light-emitting diodes (micro-LEDs), quantum dots (QDs) light-emitting diodes (such as QLEDs and QDLEDs), other suitable materials or an arbitrary combination thereof, but not limited to. The display device may include, for example, but is not limited to, a tiled display device. The concepts or principles of the present disclosure may also be applied to a non-self-luminous liquid-crystal display (LCD), but are not limited thereto.

The antenna device may be, for example, a 5G antenna, a Beyond-5G antenna, a 6G antenna, a liquid-crystal antenna, a phased array antenna, a lower orbit satellite antenna, or other kinds of antennas, but is not limited thereto. The antenna device may include, for example, but is not limited to, a tiled antenna device. It should be noted that, the electronic device may be any arrangement or combination of the foregoing, but it is not limited to this. In addition, the shape of the electronic device may be rectangular, circular, polygonal, a shape with curved edges, or other suitable shapes. The electronic device may have peripheral systems such as a driving system, a control system, a light source system, a shelf system, or the like to support the display device, the antenna device or the tiled device. The electronic device of the present disclosure may be, for example, a display device, but is not limited thereto.

The present disclosure provides an electronic device. By configuring the light-emitting elements and the optical modulation layer having different regions to correspond to each other, it is possible to improve the image quality of the electronic device at an oblique viewing angle near the boundary between the sharing and anti-peeping mode regions. Specifically, different voltages may be input to different regions of the panel in the light-emitting element through the control unit, thereby forming a light-emitting element with a bright region and a dark region. By disposing the above-mentioned dark region in the light-emitting element, the anti-peeping region and the shared region can be configured on the same panel of the electronic device at the same time. When using the electronic device of the present disclosure, when viewing the panel located in the anti-peeping region obliquely, the image content that needs to be protected from peeping will not be seen, and the image content that needs to be shared when viewing the panel located in the shared region obliquely will be seen.

FIG. 1A is a cross-sectional view of an electronic device 10 with a panel 110 disposed on an optical modulation layer 120, in accordance with some embodiments of the present disclosure. As shown in FIG. 1A, the electronic device 10 may include the panel 110, the optical modulation layer 120 that is disposed so that it corresponds to the panel 110, and a control unit 130 that is electrically connected to the panel 110. The panel 110 may include a first region 110A, a second region 110B, and a third region 110C between the first region 110A and the second region 110B. The control unit 130 may input a bright region voltage V1 to the first region 110A and the second region 110B, and input a dark region voltage V2 to the third region 110C during a plurality of operation periods. The bright region voltage V1 may be different from the dark region voltage V2 during any one of the operation periods. In some embodiments, the bright region voltage V1 is greater than the dark region voltage V2. In another embodiment, the bright region voltage V1 is smaller than the dark region voltage V2.

It should be understood that the so-called operation period may refer to the period during which the control unit 130 inputs the bright region voltage V1 to the first region 110A and the second region 110B and/or inputs the dark region voltage V2 to the third region 110C. The operation period described herein may also be understood as the period during which the control unit 130 inputs a voltage to the panel or the light-emitting element to display each frame of the electronic device. The operation period may be, for example, 1/60 second, 1/120 second, 1/144 second, 1/480 second, but not limited thereto. Furthermore, the first region 110A and the second region 110B of the panel 110 may be referred to in some discussions as different bright regions of the panel 110, and the third region 110C may be referred to as a dark region or boundary between bright regions, but not limited to this. In some embodiments, the dark region voltage input to the third region 110C during each operation period is the same.

The present disclosure does not specifically limit the implementation of the panel 110. In some embodiments, the panel 110 includes an upper substrate 112 and a lower substrate 114 that are correspondingly disposed. The panel 110 may include multiple filter units 116 between, for example, the upper substrate 112 and the lower substrate 114, and include a liquid-crystal layer (not shown) corresponding to each filter unit 116. The upper substrate 112 and the lower substrate 114 may include any suitable transparent conductive material, wherein the upper substrate 112 and the lower substrate 114 may be, for example, a flexible substrate or a rigid substrate. The flexible substrate may be, for example, a polyimide (PI) substrate. The rigid substrate may be, for example, glass, but not limited thereto. The conductive material may be, for example, indium tin oxide (ITO), tin oxide (SnO), zinc oxide (ZnO), indium zinc oxide (IZO), indium gallium zinc oxide (IGZO), indium tin zinc oxide (ITZO), antimony tin oxide (ATO), antimony zinc oxide (AZO), but not limited to this. The filter units 116 may include transparent optical glue, filter layers with filtering function, other suitable materials, or a combination thereof, but is not limited thereto. For example, the filter units 116 may include filter layers of different colors, such as a red filter layer, a green filter layer, and a blue filter layer, etc., which are used to filter out light in different wavelength ranges, but not limited to this. The filter unit 116 may also include light conversion particles to convert the light wavelength and/or color, wherein the light conversion particles may include quantum dots, phosphorescent materials, fluorescent materials, other suitable materials, or a combination of the above materials, for example. In addition, the upper substrate 112 and the lower substrate 114 may include an upper substrate 112B and a lower substrate 114B located in the bright region (such as the first region 110A and the second region 110B) of the panel 110 and an upper substrate 112D and an lower substrate 114D located in the dark region (such as the third region 110C) of the panel 110.

Specifically, the above-mentioned bright region voltage V1 provided by the control unit 130 may be respectively input to the upper substrate 112B or/and lower substrate 114B located in the first region 110A and the second region 110B, and the above-mentioned dark region voltage V2 may be input to the upper substrate 112D and/or the lower substrate 114D located in the third region 110C, respectively. By adjusting the values of the bright region voltage V1 and the dark region voltage V2, the control unit 130 can control each liquid-crystal layer, and then adjust the luminous flux passing through each filter unit 116, so as to change the grayscale value of each region of the electronic device 10, where the luminous flux is the light intensity passing through each filter unit 116 per unit time with the unit of lumen (lm), and the luminous flux may be measured by instruments such as a luminous flux meter and an illuminance meter. For example, the bright region (e.g. the first region 110A and the second region 110B) of the panel 110 is formed entirely by the filter units 116 (e.g., the filter units 116B) where a larger luminous flux passes through, which has a greater grayscale value. On the other hand, the dark region (such as the third region 110C) of the panel 110 is formed entirely by the filter units 116 (such as the filter units 116D) where a small luminous flux passes through, which has a smaller grayscale value. In some embodiments, the grayscale values of the first region 110A and the second region 110B may be one of, for example, between 255 and 128, less than or equal to 128, between 128 and 64, less than 64, or a combination thereof. In some embodiments, the grayscale value of the third region 110C may be one of, for example, less than or equal to 128, between 128 and 64, less than 64, or a combination thereof. In another embodiment, under the same operation period, the grayscale values of the first region 110A and the second region 110B are different from the grayscale value of the third region 110C. In another embodiment, under the same operation interval, the grayscale values of the first region 110A and the second region 110B are greater than the grayscale value of the third region 110C.

In some embodiments, the control unit 130 respectively outputs the bright region voltage V1 and the dark region voltage V2 to the upper substrate 112 or/and the lower substrate 114 located in predetermined regions of the bright region and the dark region of the panel 110 to form the bright region and the dark region. It should be understood that the positions of the bright region and the dark region of the panel 110 are actually not impossible to change. By outputting each of the bright region voltage V1 and the dark region voltage V2 from the control unit 130 to different positions of the panel 110, the user can change the positions of the bright region and dark region of the panel 110 according to requirements, and even remove the dark region (such as the third region 110C) between multiple bright regions (such as the first region 110A and the second region 110B), wherein the control unit 130 may include capacitors, resistors, inductors, diodes, transistors, integrated circuit (IC), micro integrated circuit (Micro IC), thin film transistor, or a combination of, but not limited thereto.

In some embodiments, the electronic device 10 further includes a backlight module 105 that provides light, but is not limited thereto. The light provided by the backlight module 105 can pass through the optical modulation layer 120 and the first region 110A of the panel 110 to become the first emitted light EL1 with a first brightness viewing angle, and the light can pass through the optical modulation layer 120 and the second region 110B of the panel 110 to become the second emitted light EL2 with a second brightness viewing angle. In some embodiments, as shown in FIG. 1A, the light first passes through the optical modulating layer 120 and then passes through the panel 110.

It should be understood that, in the discussion of this disclosure, the term "brightness viewing angle" refers to the angle corresponding to a specific intensity having a specific ratio to the peak intensity in the intensity-angle distribution of the light, which may be measured by, for example, by a display color analyzer (such as a display color analyzer of model ca210), or measured by an optical viewing angle measuring instrument (such as an optical viewing angle measuring instrument of model WP_Conometer 80). For example, the angle corresponding to when the intensity in the intensity-angle distribution is about 10%, 20%, 30%, 40%, or 50% of the peak intensity may be defined as the brightness viewing angle of the light, but not limited to this. Since the light intensity at angles above the brightness viewing angle is extremely low, for the light finally observed by the user of the electronic device of the present disclosure, the light from the angle above the brightness viewing angle may be ignored. In addition, the term "emitted light" is defined as the light exiting from the panel, and the term "modulated light" is defined as the light exiting the optical modulation layer 120 after being modulated in the optical modulation layer 120.

The optical modulation layer 120 may be used to modulate light (for example, light from the backlight module 105 or other suitable light sources) into the first modulated light ML1 and the second modulated light ML2 with different brightness viewing angles. In some embodiments, the optical modulation layer 120 includes a first portion 120A corresponding to the first region 110A and a second portion 120B corresponding to the second region 110B, and the second portion 120B is connected to the first portion 120A. In some embodiments, the first modulated light ML1 from the first portion 120A has a smaller brightness viewing angle than the second modulated light ML2 from the second portion 120B.

In some embodiments, after the light provided by the backlight module 105 passes through the second portion 120B, the brightness viewing angle becomes larger and becomes the second modulated light ML2. In some embodiments, the light provided by the backlight module 105 becomes the first modulated light ML1 after passing through the first portion 120A, and the viewing angle becomes smaller. In some embodiments, the boundary between the first portion 120A and the second portion 120B overlaps with the third region 110C.

It should be understood that, in some embodiments, as shown in FIG. 1A, the light first passes through the optical modulation layer 120 and then passes through the panel 110, so that the light finally observed by the user may be the first emitted light EL1 and the second emitted light EL2 from the panel 110. However, in some other embodiments, as shown in the subsequent FIG. 1B, the light first passes through the panel 110, or the light is emitted from the panel 110, and then passes through the optical modulation layer 120, so that the light finally observed by the user may be are the first modulated light ML1 and the second modulated light ML2 from the optical modulation layer 120.

As shown in FIG. 1A, the first modulated light ML1 and the second modulated light ML2 from the optical modulation layer 120 may pass through the first region 110A and the second region 110B of the panel 110, respectively. Although part of the first modulated light ML1 and the second modulated light ML2 are irradiated on the third region 110C of the panel 110, since the third region 110C has a smaller grayscale value, the luminous flux passing through the filter units 116D located in the third region 110C may be lower, so it can be ignored by the user. Here, the luminous flux is the light intensity passing through each filter unit 116 per unit time with the unit of lumen (lm), and the luminous flux may be measured by instruments such as a luminous flux meter and an illuminance meter.

By disposing the third region 110C input with the dark region voltage V2 in the panel 110 of the electronic device 10 and disposing the optical modulation layer 120 under the panel 110 to generate the modulated light ML1 and ML2 with different brightness viewing angles, the anti-peeping region and the shared region of the panel 110 may be defined. The functions of the electronic device 10 will be described below with reference to FIG. 1A. When using the electronic device 10 of the present disclosure, when the user U1 squints to see the panel 110 located in the first region 110A, the image content that needs to be protected from peeping will not be seen, and when the user U2 squints to see the panel 110 located in the second region 110B, the image content that needs to be shared may also be seen. Therefore, the first region 110A may be defined as the anti-peeping region and the second region 110B may be defined as the shared region. In addition, as shown in FIG. 1A, although the second modulated light ML2 has a larger brightness viewing angle and part of the second modulated light ML2 may pass through the first region 110A, the width W of the third region 110C (corresponding to the total width of the multiple filter units 116D) may be adjusted to, such that the part of the second modulated light ML2 within the brightness viewing angle will substantially not pass through the first region 110A.

In summary, by using the control unit 130 to input the bright region voltage and the dark region voltage to different regions of the panel 110 during operation periods, the anti-peeping region and the shared region can be configured on the same panel 110 of the electronic device 10 at the same time. Since the panel 110 is provided with the third region 110C, the image quality of the electronic device 10 can be improved when viewed from an oblique viewing angle near the boundary between the anti-peeping region and the shared region. The oblique viewing angle may be, for example, the angle between the viewing direction and the normal direction of the anti-peeping region or the shared region, which is one of 80 degrees, 70 degrees, 60 degrees, 50 degrees, 40 degrees, 30 degrees, and 20 degrees, or a combination thereof, but not limited thereto.

Figure 1B:
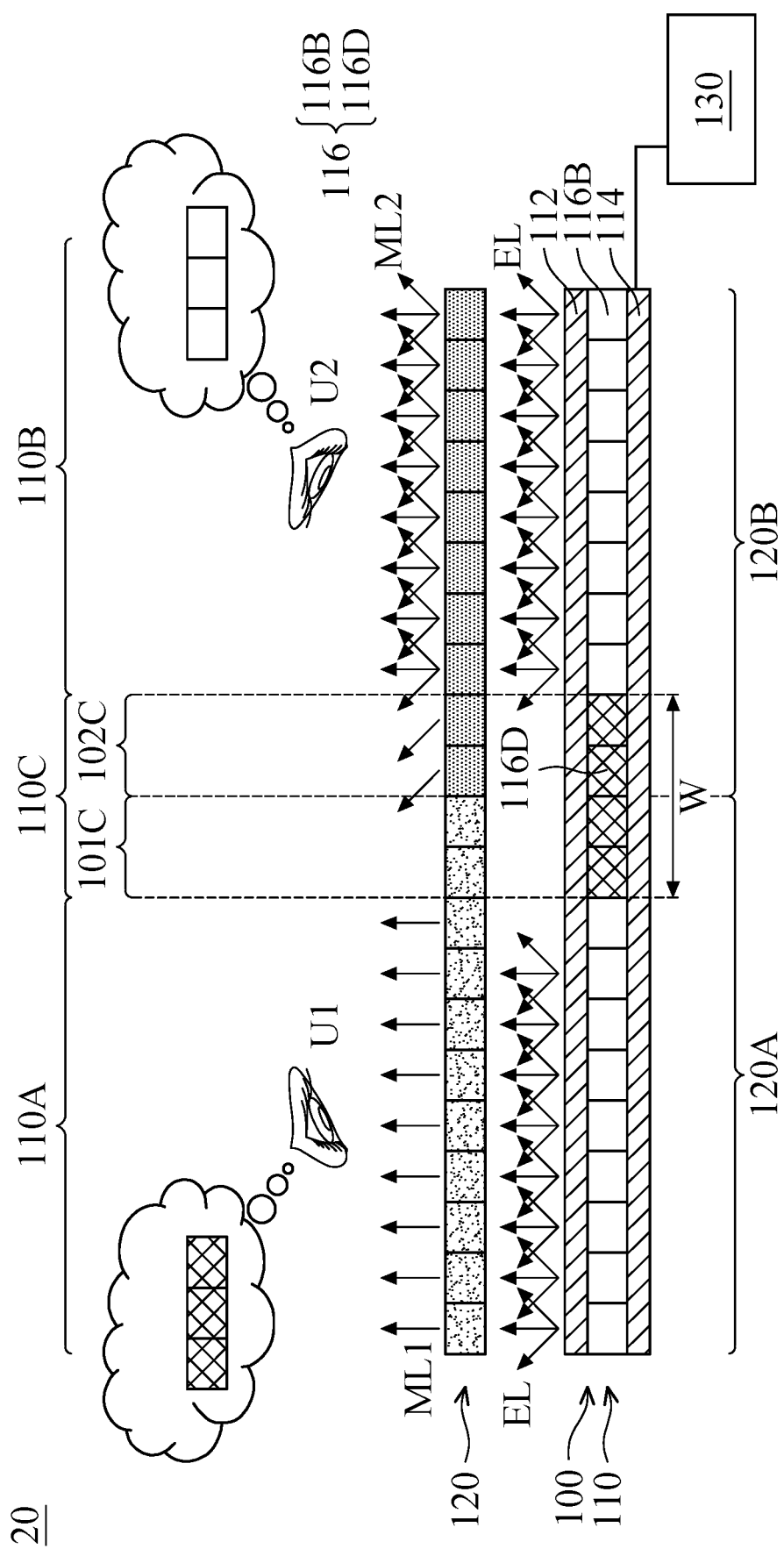
FIG. 1B illustrates a cross-sectional view of an electronic device with an optical modulation layer disposed over a panel, in accordance with some embodiments of the present disclosure.

FIG. 1B illustrates a cross-sectional view of an electronic device with the optical modulation layer 120 disposed over the panel 110, in accordance with some embodiments of the present disclosure. As shown in FIG. 1B, the electronic device 20 may include a panel 110, an optical modulation layer 120 corresponding to the panel 110, and a control unit 130 electrically connected to the panel 110. In some embodiments, the panel 110 includes a light-emitting element 100, the light-emitting element 100 may be used to emit the emitted light EL, the emitted light EL may be, for example, one of red, green, and blue light, or a combination thereof, and the emitted light EL may correspond to the first region 110A and the second region 110B of the panel 110 and the third region 110C disposed between the first region 110A and the second region 110B, respectively. The control unit 130 may be electrically connected to the light-emitting element 100. In some embodiments, the optical modulation layer 120 has a first portion 120A and a second portion 120B connected to each other. The third region 110C may have a first sub-region 101C overlapping the first portion 120A and a second sub-region 102C overlapping the second portion 120B. The first modulated light ML1 from the first portion 120A may have a first brightness viewing angle, and the second modulated light ML2 from the second portion 120B may have a second brightness viewing angle. In some embodiments, the first brightness viewing angle is smaller than the second brightness viewing angle. In some embodiments, the first brightness viewing angle may be less than or equal to 20 degrees, and the second brightness viewing angle may be, for example, 20 degrees to 40 degrees, 40 degrees to 60 degrees, 60 degrees to 80 degrees, or a combination thereof, but not limited thereto.

The light-emitting element 100 of the panel 110 may have a light-emitting function. For example, the light-emitting element 100 is, for example, a submillimeter light-emitting diode (mini LED), a micro-light-emitting diode (micro LED), an organic light-emitting diode (OLED), other suitable light sources, or a combination thereof, but not limited thereto. In some other embodiments, although the backlight module is not shown in FIG. 1B, the electronic device 20 may further include a backlight module (not shown in FIG. 1B) in addition to the panel 110. The backlight module may be disposed on the side of the panel 110 opposite the optical modulation layer 120. Alternatively, in some embodiments, the light is provided by the backlight module, and the wavelength and/or color of the light is converted by the filter units 116 first, and then passes through the optical modulation layer 120. The present disclosure does not specifically limit the electronic device 20 on how the light source is configured.

As shown in FIG. 1B, the light from the light source of the electronic device 20 first passes through the light-emitting element 100 (such as the panel 110 in the light-emitting element 100) and then passes through the optical modulation layer 120. Except for the order in which the panel 110 and the optical modulation layer 120 are arranged correspondingly, the panel 110, the optical modulation layer 120, and the control unit 130 in the electronic device 20 may be similar to those in the electronic device 10, and their descriptions are omitted here for simplicity. In some embodiments, the control unit 130 inputs the dark region voltage to the third region 110C, so that the grayscale value of the third region 110C may be, for example, less than 128, between 128 and 64, or less than 64. The above-mentioned dark region voltage may be different from the bright region voltage input to the first region 110A and the second region 110B in any operation period. In some embodiments, the emitted light EL from the first region 110A passes through both the first portion 120A and the second portion 120B. In some embodiments, the emitted light EL from the first region 110A and the second region 110B has the same brightness viewing angle. For example, since the light from the light source (such as the backlight module, or the light source in the panel 110) is not modulated before leaving the light-emitting element 100, the emitted light EL may emit from the entire upper surface of the light-emitting element 100 with a specific brightness viewing angle.

In some embodiments, the emitted light EL passes through the first portion 120A to become the first modulated light ML1, and the emitted light EL passes through the second portion 120B to become the second modulated light ML2. In some embodiments, the brightness viewing angle of the emitted light EL is larger than the brightness viewing angle of the first modulated light ML1. In some embodiments, the brightness viewing angle of the emitted light EL is smaller than the brightness viewing angle of the second modulated light ML2, and the modulation of the brightness viewing angle by the optical modulation layer 120 may be described as above, and will not be repeated here, but it is not hereto limit.

As shown in FIG. 1B, although the first sub-region 101C and the second sub-region 102C of the third region 110C overlap with the first portion 120A and the second portion 120B of the optical modulation layer 120 respectively, since the third region 110C has a smaller grayscale value, and the luminous flux passing through the filter units 116D located in the third region 110C is lower, it can be ignored by users.

By disposing the third region 110C input with a lower voltage in the light-emitting element 100 of the electronic device 20 and disposing the optical modulation layer 120 on the light-emitting element 100 to generate modulated lights ML1 and ML2 with different brightness viewing angles, the anti-peeping region and shared region of the light-emitting element 100 can be defined. The functions of the electronic device 20 will be described below with reference to FIG. 1B. When using the electronic device 20 of the present disclosure, when the user U1 squints at the light-emitting element 100 located in the first region 110A, the image content that needs to be protected from peeping will not be seen, and when the user U2 squints at the light-emitting element 100 located in the second region 110B, the image content that needs to be shared may also be seen. Therefore, the first region 110A may be defined as the anti-peeping region and the second region 110B may be defined as the shared region.

In summary, by using the control unit 130 to input the bright region voltage and the dark region voltage to different regions of the light-emitting element 100 during the operation periods, it is possible to configure the anti-peeping region and the shared region on the same light-emitting element 100 of the electronic device 20 at the same time. Since the panel 110 is provided with the third region 110C, the image quality of the electronic device 20 can be improved when viewed at an oblique viewing angle near the boundary between the anti-peeping region and the shared region, and further prevent the image of the anti-peeping region from being seen by the observer at angles other than the brightness viewing angle.

Figure 2:
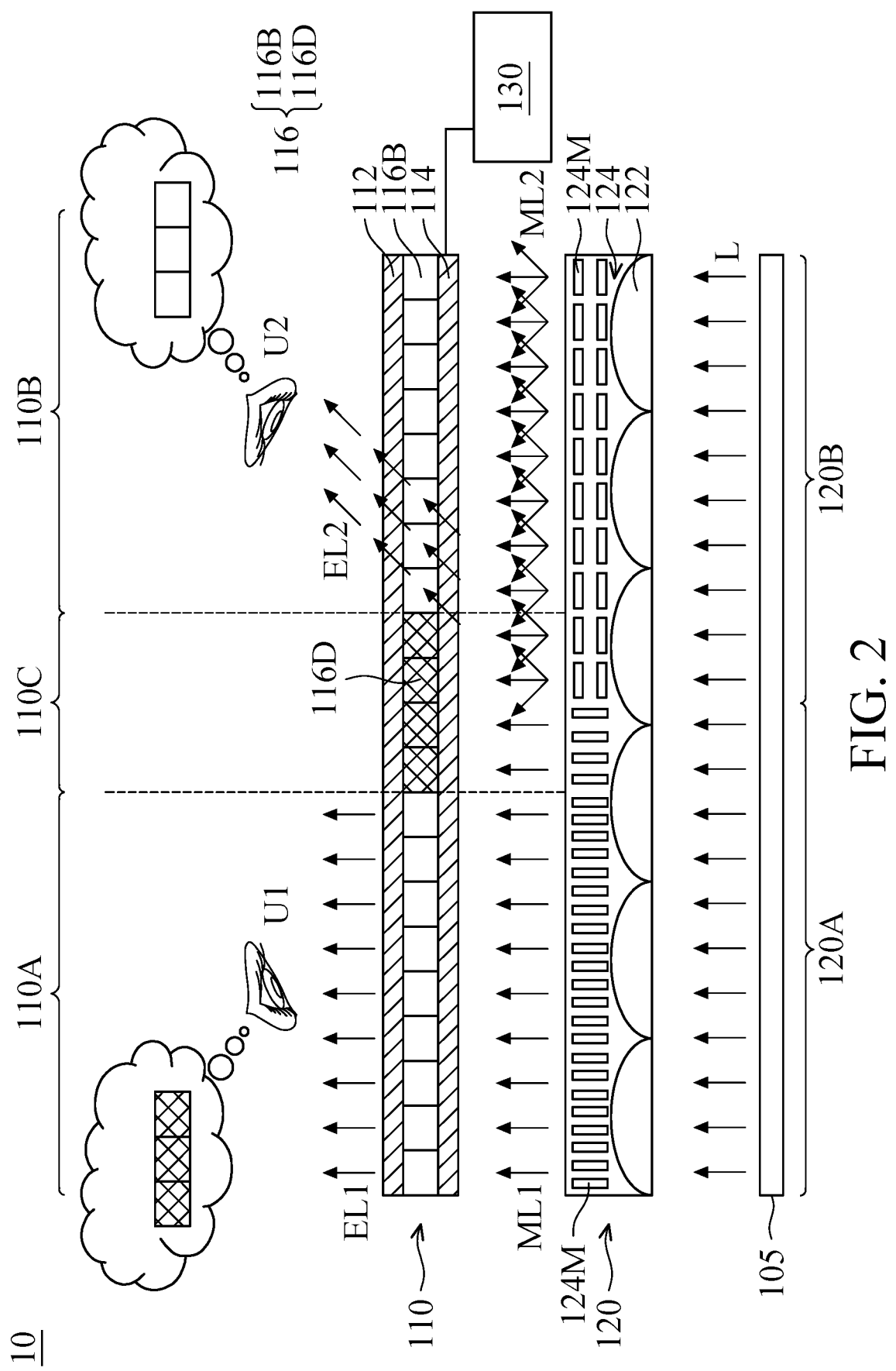
FIGS. 2, 3 and 4A illustrate cross-sectional views of the electronic device including different types of the optical modulation layer, in accordance with other embodiments of the present disclosure.
Figure 3:
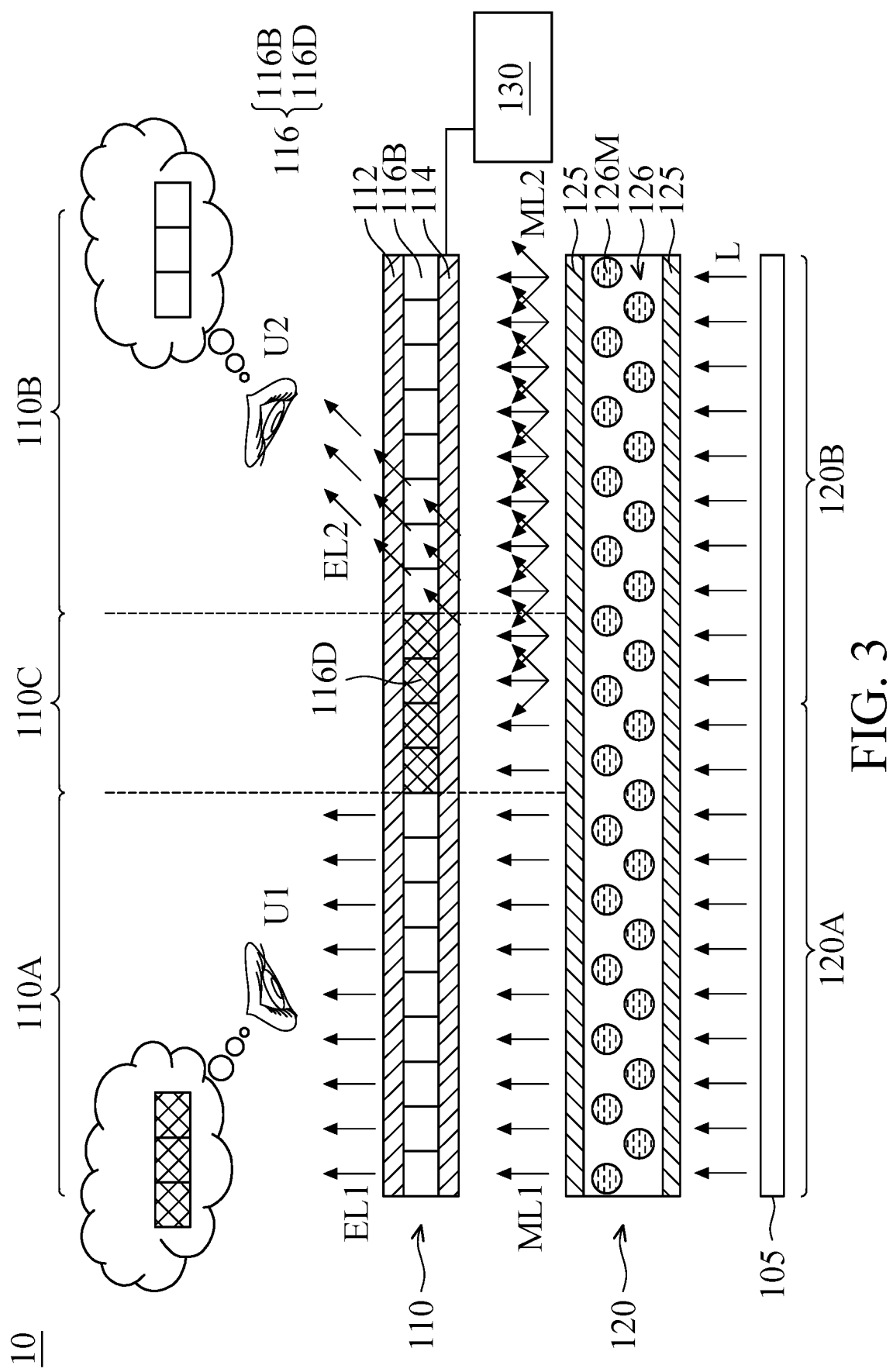
Figure 4A:
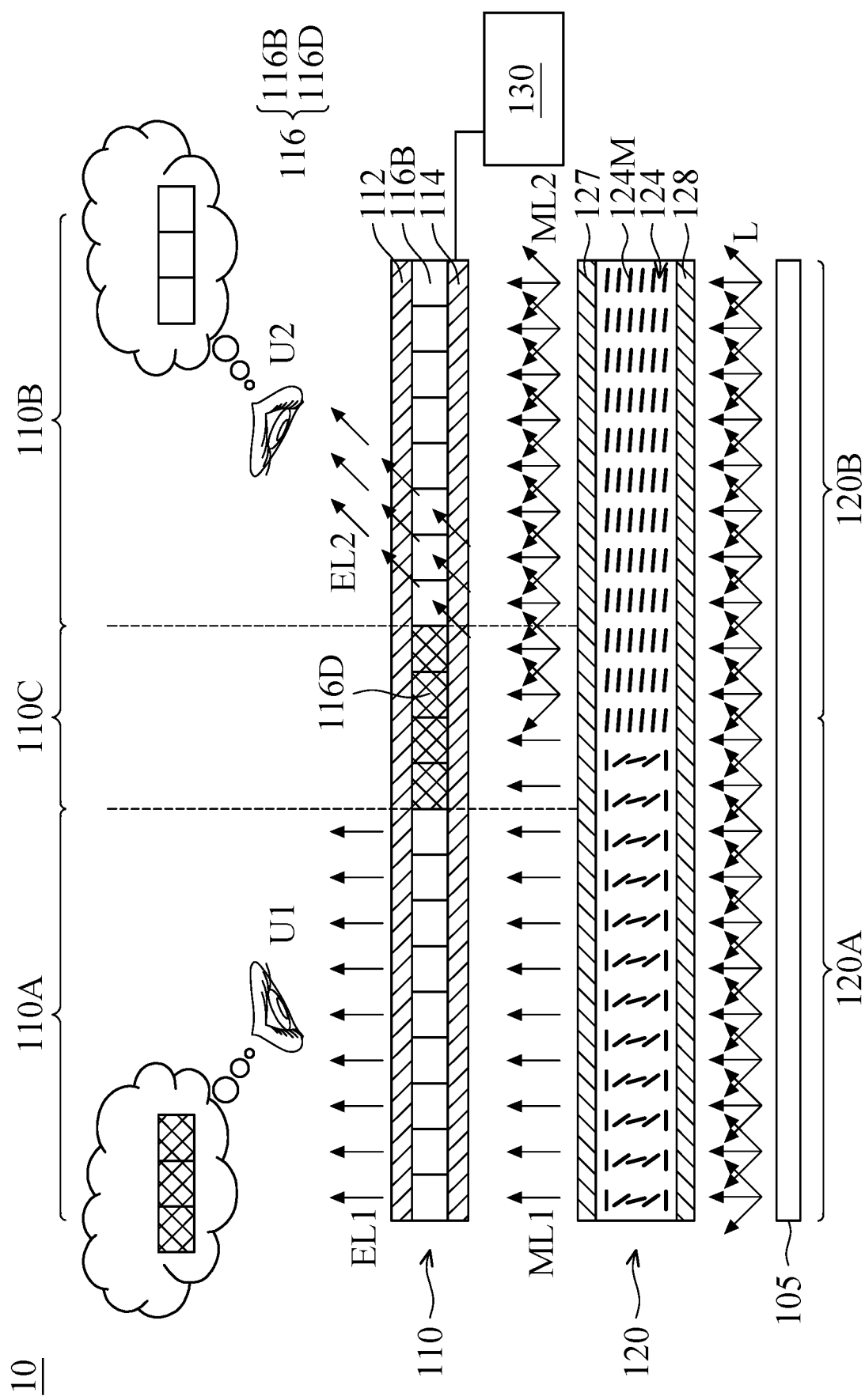
Figure 4B:
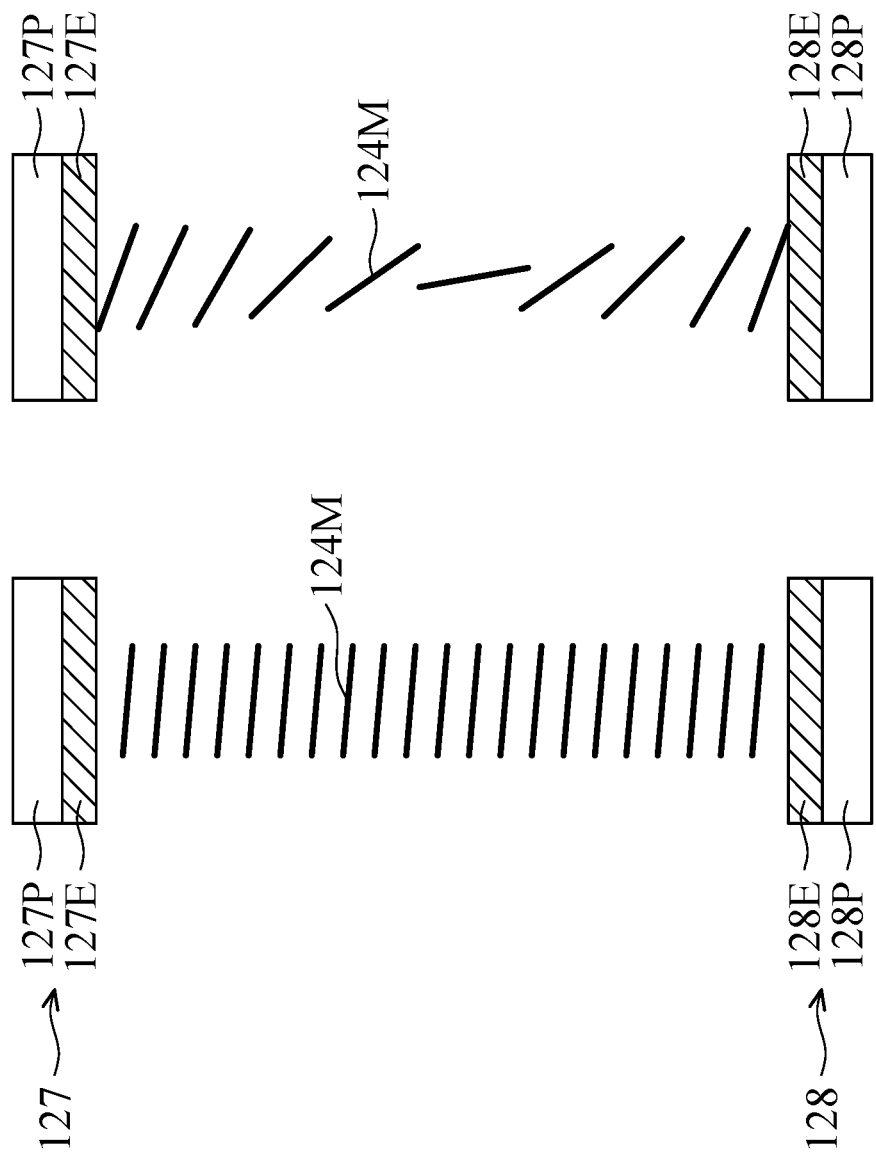
FIG. 4B illustrates a cross-sectional view of the optical modulation layer under different modes, in accordance with some embodiments of the present disclosure.

FIGS. 2, 3 and 4A illustrate cross-sectional views of the electronic device 10 including different types of the optical modulation layer 120, in accordance with other embodiments of the present disclosure. FIG. 4B illustrates a cross-sectional view of the optical modulation layer 120 under different modes, in accordance with some embodiments of the present disclosure. Although various implementations of the optical modulation layer 120 are illustrated in FIGS. 2, 3, 4A, and 4B with the electronic device 10 having the panel 110 disposed over the optical modulation layer 120, the present disclosure is not limited thereto. In other embodiments, the optical modulation layer 120 shown in FIGS. 2, 3, 4A, and 4B may also be applied to the electronic device 20 in which the optical modulation layer 120 is disposed over the panel 110.

In some embodiments, as shown in FIG. 2, the optical modulation layer 120 includes a lens layer 122 and a liquid-crystal layer 124. The material of the liquid-crystal layer 124 may include, for example, cholesteric liquid crystal, other suitable liquid-crystal materials, or a combination of the above materials, but is not limited thereto. By applying different voltages to the first portion 120A and the second portion 120B respectively, part of the liquid-crystal molecules 124M in the liquid-crystal layer 124 can be rotated to change the local refractive index of the liquid-crystal layer 124.

For example, a voltage may be applied so that the liquid-crystal layer 124 located in the first portion 120A has the same refractive index as the material of the lens layer 122, and the liquid-crystal layer 124 located in the second portion 120B has a refractive index different from the material of the lens layer 122. In this way, after the light L from the backlight module 105 with a smaller brightness viewing angle is modulated by the optical modulation layer 120, the first portion 120A generates the first modulated light ML1 with a smaller brightness viewing angle, and the second portion 120B generates the second modulated light ML2 with an increased brightness viewing angle. However, the present disclosure is not limited thereto. In fact, a wide light source that emits light with a greater viewing angle may also be used for the backlight module 105, and the voltage applied to the optical modulation layer 120 may be adjusted to change the brightness viewing angle of the first modulated light ML1 and the second modulated light ML2.

The material of the lens layer 122 may include any transparent material. Examples of the transparent material may include, for example, glass, resin, silicone, acrylic glue, other suitable transparent materials, or a combination thereof, but are not limited thereto. The lens layer 122 may include an optical structure. For example, the optical structure may be a diffuser including microstructures, but this embodiment is not limited thereto. In some other embodiments, the lens layer 122 may be replaced by a light concentrating structure, such as a semi-convex lens, a convex lens, or a conical structure (e.g., a cone, a quadrangular pyramid, a flat-topped cone, a flat-topped quadrangular pyramid, etc.). Alternatively, the light concentrating structure may be a gradient-index structure or a diffraction optical element.

In some embodiments, as shown in FIG. 3, the optical modulation layer 120 may include conductive substrates 125 and a polymer dispersed liquid-crystal (PDLC) layer 126 between the conductive substrates 125. The PDLC layer 126 is a composite film in which liquid-crystal droplets 126M with anisotropy are dispersed in a polymer substrate, and the applied electric field from the conductive substrates 125 can regulate the refractive index relationship between the liquid-crystal droplets and the polymer substrate, thereby producing a state of light scattering or light penetration.

The material of the conductive substrates 125 may include any suitable transparent conductive materials, wherein the upper substrate 112 and the lower substrate 114 may be, for example, a flexible substrate or a hard substrate. The flexible substrate may be, for example, a polyimide (PI) substrate. The hard substrate may be, for example, glass, but not limited thereto. The conductive material may be, for example, indium tin oxide (ITO), but not limited thereto. The polymer base of the PDLC layer 126 may include 5CB, 5CT, other suitable polymer materials, or a combination thereof, but is not limited thereto. The liquid-crystal droplets 126M with a submicron size may have positive dielectric anisotropy, and its molecular types include Nematic, Smetic, ChCLC, Ferroelectric Smetic, Antiferroelectric Smetic, or Guest-Host, but are not limited thereto.

A voltage may be applied to make the PDLC layer 126 in the first portion 120A in a light-transmitting state, and to make the PDLC layer 126 in the second portion 120B in a light-scattering state. In this way, after the light L from the backlight module 105 with a smaller brightness viewing angle is modulated by the optical modulation layer 120, the first portion 120A generates the first modulated light ML1 with a smaller brightness viewing angle, and the second portion 120B generates the second modulated light ML2 with an increased brightness viewing angle.

In addition, although the backlight module 105 shown in FIG. 3 emits light L with a smaller brightness viewing angle, it is actually possible to use a wide light source that emits light with a larger brightness viewing angle for the backlight module 105, and adjust the voltage applied to the optical modulation layer 120 to change the brightness viewing angle of the first modulated light ML1 and the second modulated light ML2.

In some embodiments, the optical modulation layer 120 may be a panel using an electrically controlled birefringence (ECB) mode. As shown in FIG. 4A, the optical modulation layer 120 includes polarizing substrates 127 and 128 overlapping each other in the normal direction of the optical modulating layer 120 and a liquid-crystal layer 124 between the polarizing substrates 127 and 128. As shown in FIG. 4B, the polarizing substrates 127 and 128 may include polarizers 127P and 128P and electrodes 127E and 128E adjacent to the liquid-crystal layer 124. By adjusting the orientation of the liquid-crystal molecules 124M in the liquid-crystal layer 124 and the polarization directions of the polarizers 127P and 128P disposed correspondingly vertically, the brightness viewing angle of the light passing through the optical modulation layer 120 can be changed.

Referring to FIG. 4B, by applying an electric field with electrodes 127E and 128E to control the rotation of the liquid-crystal molecules 124M, the polarization direction of light in the liquid-crystal layer 124 can be changed, so that the optical modulation layer 120 can locally generate modulated lights for anti-peeping regions or shared regions. For example, in some embodiments, the backlight module 105 is a wide light source that emits light L with a larger brightness viewing angle, as shown in FIG. 4A. When the electrodes 127E and 128E do not apply a voltage to the liquid-crystal molecules 124M, the liquid-crystal molecules are arranged in parallel to generate the second modulated light ML2 for the shared region of the electronic device 10. When a voltage is applied to the liquid-crystal molecules 124M through the electrodes 127E and 128E, the vertical alignment of the liquid-crystal molecules 124M can change the polarization direction of light at large angles, so that the light cannot pass through the polarizers 127P and 128P parallel to each other, so as to generate the first modulated light ML1 for the anti-peeping region of the electronic device 10.

In addition, although the backlight module 105 shown in FIG. 4A is a wide light source that emits light L with a larger brightness viewing angle, it is actually possible to use a narrow light source that emits light with a smaller brightness viewing angle for the backlight module 105, and adjust the voltage applied to the optical modulation layer 120 to change the brightness viewing angle of the first modulated light ML1 and the second modulated light ML2.

The materials of the polarizers 127P and 128P may include triacetyl cellulose (TAC), polyvinyl alcohol (PVA), pressure-sensitive adhesive, release film, protective film, other suitable materials, or a combination thereof. The materials of the electrodes 127E and 128E may include conductive materials, such as metals, metal compounds, or combinations thereof. For example, the metals include gold, nickel, platinum, palladium, iridium, titanium, chromium, tungsten, aluminum, copper, silver, alloys thereof, multilayer structures thereof, or a combination thereof; the metal compounds include, but are not limited to, titanium nitride. The material of the liquid-crystal layer 124 may include, for example, cholesteric liquid crystal, other suitable liquid-crystal materials, or a combination of the above materials, but is not limited thereto.

Figure 5A:
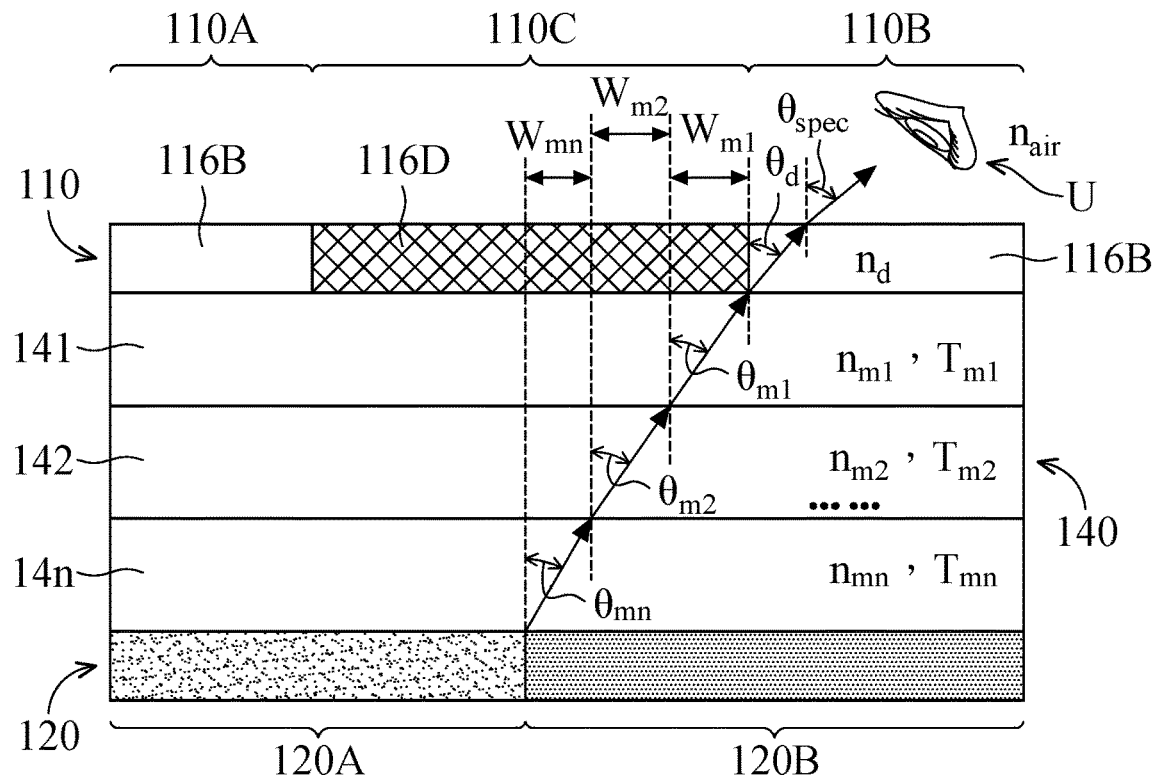
FIGS. 5A and 5B illustrate local cross-sectional views of an electronic device including a second optical modulation layer, in accordance with some embodiments of the present disclosure.
Figure 5B:
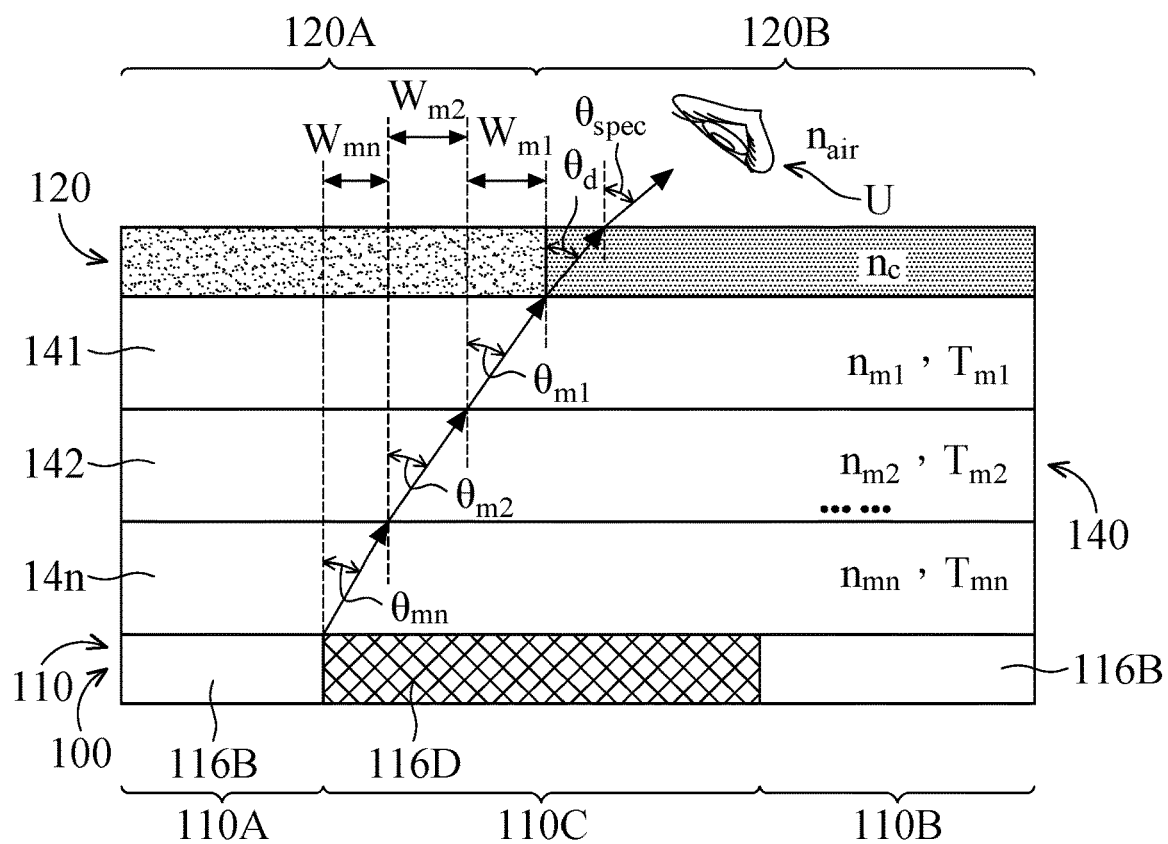

FIGS. 5A and 5B illustrate local cross-sectional views of electronic devices 10 and 20 including a second optical modulation layer 140 respectively, in accordance with some embodiments of the present disclosure. In some embodiments, the electronic devices 10 and 20 further include the second optical modulation layer 140 disposed between the panel 110 and the optical modulation layer 120. All the layers between the panel 110 and the optical modulation layer 120 may be collectively defined as the second optical modulation layer 140, and these layers may include substrates, polarizers, bonding glue, haze glue, air, other suitable layers, or a combination thereof, but not limited thereto. In addition, the present disclosure does not limit the stacking order of the above-mentioned layers. For the sake of simplicity, only the layers 141, 142, 14n, etc. included in the second optical modulation layer 140 are shown in FIGS. 5A and 5B, which means that the second optical modulation layer 140 may include n layers, and a person skilled in the art can adjust the type, composition, and number of the above-mentioned layers according to the design requirements of the electronic device. It should be understood that, for the sake of simplicity, each filter unit 116B and each filter unit 116D are shown as connected single blocks in FIGS. 5A and 5B and subsequent figures, rather than multiple blocks separated from each other.

As shown in FIG. 5A, the modulated light from the optical modulation layer 120 of the electronic device 10 may enter the second optical modulation layer 140, enter the panel 110, and then leave the electronic device 10 from the surface of the panel 110 to become the emitted light. Depending on the refractive index $n_{air}$ of air, the refractive index $n_d$ of the panel 110, and the thickness $T_{m1}$, $T_{m2}$, $T_{mn}$, etc. and refractive index $n_{m1}$, $n_{m2}$, $n_{mn}$, etc. of each layer 141, 142, 14n, etc. of the second optical modulation layer 140, the brightness viewing angle observed by the user U, that is, the user's side viewing angle $\theta_{spec}$, will be affected. In a specific embodiment, the user's side viewing angle $\theta_{spec}$ may range, for example, from about 30 degrees to 45 degrees, or about 45 degrees to 60 degrees. In addition, the deflection of the modulated light at the interface between the various layers 141, 142, 14n, etc. of the second optical modulation layer 140 will generate horizontal displacements $W_{m1}$, $W_{m2}$, $W_{mn}$, etc. in the horizontal direction. One with ordinary skill in the art can design the width of the third region 101C through the horizontal displacements $W_{m1}$, $W_{m2}$, $W_{mn}$, etc.

On the other hand, as shown in FIG. 5B, the modulated light from the optical modulation layer 120 of the electronic device 20 may enter the second optical modulation layer 140, enter the optical modulation layer 120, and then leave the electronic device 20 from the surface of the optical modulation layer 120 to become the modulated light. Depending on the refractive index $n_{air}$ of air, the refractive index $n_c$ of the modulation layer 120, and the thickness $T_{m1}$, $T_{m2}$, $T_{m1}n$, etc. and refractive index $n_{m1}$, $n_{m2}$, $n_{mn}$, etc. of each layer 141, 142, 14n, etc. of the second optical modulation layer 140, the brightness viewing angle observed by the user U, that is, the user's side viewing angle $\theta_{spec}$, will be affected. In a specific embodiment, the user's side viewing angle $\theta_{spec}$ may range, for example, from about 30 degrees to 45 degrees, or about 45 degrees to 60 degrees. In addition, the deflection of the modulated light at the interface between the various layers 141, 142, 14n, etc. of the second optical modulation layer 140 will generate horizontal displacements $W_{m1}$, $W_{m2}$, $W_{mn}$, etc. in the horizontal direction. One with ordinary skill in the art can design the width of the third region 101C through the horizontal displacements $W_{m1}$, $W_{m2}$, $W_{mn}$, etc.

Figure 6A:
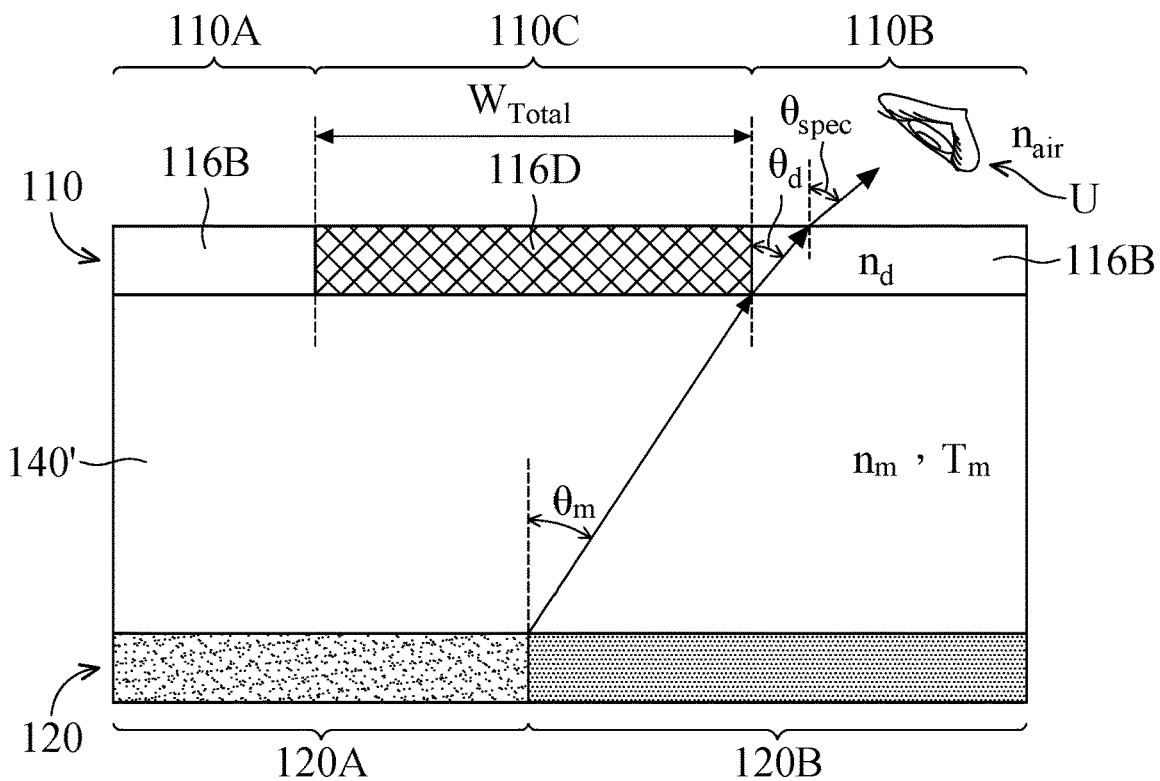
FIGS. 6A and 6B illustrate local cross-sectional views of an electronic device including a second optical modulation layer, in accordance with some embodiments of the present disclosure.
Figure 6B:
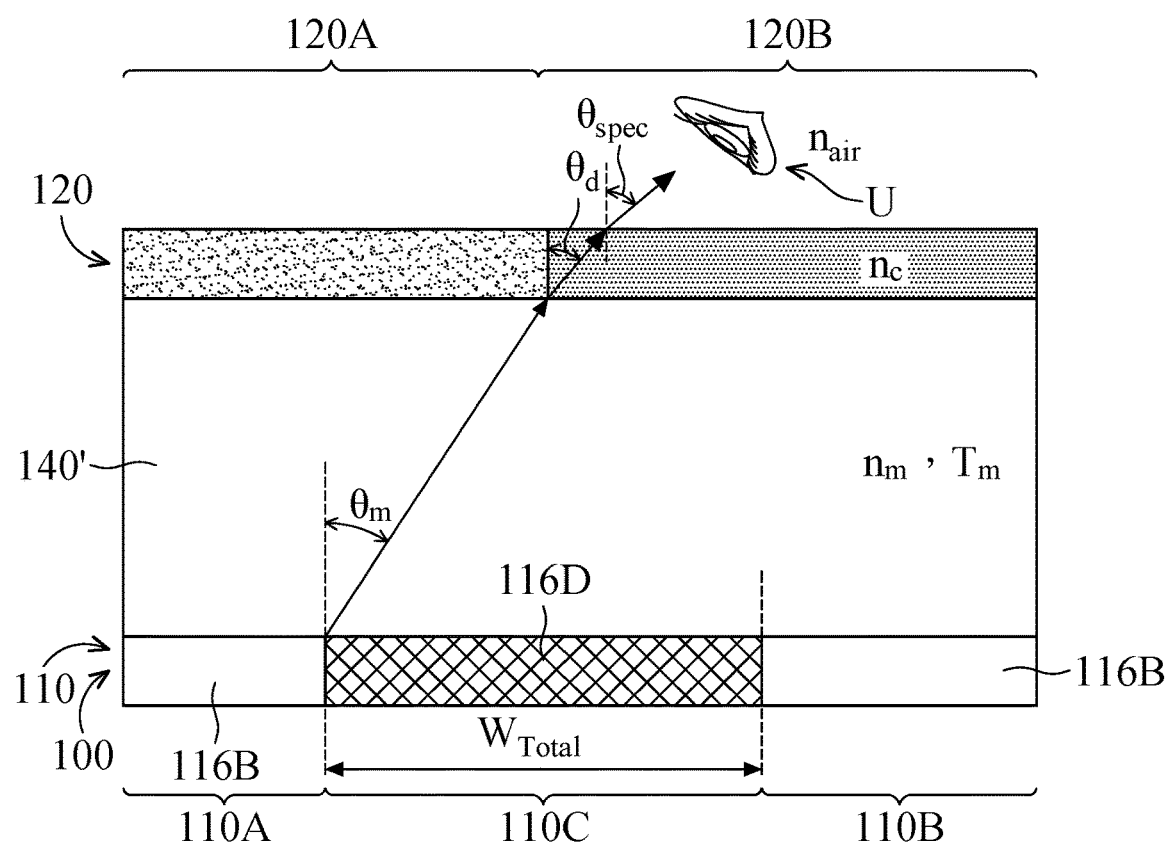

FIGS. 6A and 6B illustrate local cross-sectional views of electronic devices 10 and 20 including a second optical modulation layer 140' respectively, in accordance with some embodiments of the present disclosure. Actually, the second optical modulation layer 140 of the electronic devices 10 and 20 may be regarded as a single-layered second optical modulation layer 140' having an equivalent refractive index $n_m$ and an equivalent thickness $T_m$. In this way, the equivalent refraction angle $\theta_m$ of the emitted light in the electronic device 10 or the modulated light in the electronic device 20 in the second optical modulation layer 140' can be used to obtain the horizontal displacement of light in the second optical modulation layer 140', thereby obtaining the suitable width $w_{Total}$ of the third region 110C. The width $W_{Total}$ of the third region 110C may conform to the following relationship:

$$W_{Total} = 2 \times T_m \times \tan\left[\sin^{-1}\left(\frac{n_{air}}{n_m} \sin \theta_{spec}\right)\right]$$

By disposing the third region with the above width $W_{Total}$, the image quality near the boundary of the anti-peeping region and the shared region at oblique viewing angle may be improved, such that the user U can observe the image with good quality within the brightness viewing angle of the observed light.

In summary, the present disclosure provides an electronic device. By configuring the light-emitting elements and the optical modulation layer having different regions to correspond to each other, it is possible to improve the image quality of the electronic device at an oblique viewing angle near the boundary between the sharing and anti-peeping mode regions. Specifically, different voltages may be input to different regions of the panel in the light-emitting element through the control unit, thereby forming a light-emitting element with a bright region and a dark region. By disposing the above-mentioned dark region in the light-emitting element, the anti-peeping region and the shared region can be configured on the same panel of the electronic device at the same time. When using the electronic device of the present disclosure, when viewing the panel located in the anti-peeping region obliquely, the image content that needs to be protected from peeping will not be seen, and the image content that needs to be shared when viewing the panel located in the shared region obliquely will be seen.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An electronic device, comprising:
   a panel comprising a first region, a second region, and a third region between the first region and the second region;
   an optical modulation layer disposed so that it corresponds to the panel;
   a second optical modulation layer disposed between the panel and the optical modulation layer; and
   a control unit electrically connected to the panel, wherein the control unit inputs a bright region voltage to the first region and the second region, and inputs a dark region voltage to the third region during a plurality of operation periods, wherein the bright region voltage differs from the dark region voltage during any of the operation periods, wherein the second optical modulation layer has an equivalent thickness $T_m$ and an equivalent refractive index nm, and a width of the third region in a direction is $W_{Total}$, which conforms to the following relationship:

$$W_{Total} = 2 \times T_m \times \tan\left[\sin^{-1}\left(\frac{n_{air}}{n_m} \sin \theta_{spec}\right)\right]$$

wherein $\theta_{spec}$ is a side viewing angle of a user, and $n_{air}$ is the refractive index of air.

2. The electronic device as claimed in claim 1, wherein the dark region voltage input to the third region during each of the operation periods is the same.

3. The electronic device as claimed in claim 1, wherein a grayscale value of the third region is lower than 128.

4. The electronic device as claimed in claim 1, further comprising:

a backlight module providing light, wherein the light passes through the optical modulation layer and the first region of the panel to become a first emitted light with a first brightness viewing angle, and the light passes through the optical modulation layer and the second region of the panel to become a second emitted light with a second brightness viewing angle, wherein the first brightness viewing angle is smaller than the second brightness viewing angle.

5. The electronic device as claimed in claim 4, wherein the light passes through the optical modulation layer first and then passes through the panel.

6. The electronic device as claimed in claim 1, wherein the optical modulation layer comprises:

a first portion overlapping the first region; and a second portion overlapping the second region and connected to the first portion, wherein a first modulated light from the first portion has a smaller brightness viewing angle than a second modulated light from the second portion.

7. The electronic device as claimed in claim 6, further comprising:

a backlight module providing light, wherein after the light passes through the second portion, the brightness viewing angle becomes larger, and the light becomes the second modulated light.

8. The electronic device as claimed in claim 6, further comprising:

a backlight module providing light, wherein after the light passes through the first portion, the brightness viewing angle becomes smaller, and the light becomes the first modulated light.

9. The electronic device as claimed in claim 6, wherein a boundary between the first portion and the second portion overlaps the third region.

10. The electronic device as claimed in claim 1, wherein the optical modulation layer comprises a lens layer and a liquid-crystal layer.

11. An electronic device, having a first region, a second region, and a third region disposed between the first region and the second region, wherein the electronic device comprises:

a panel emitting an emitted light corresponding to the first region and the second region;

an optical modulation layer disposed so that it corresponds to the panel and having a first portion and a second portion connected to each other;

a second optical modulation layer disposed between the panel and the optical modulation layer; and a control unit electrically connected to the panel, wherein the third region has:

a first sub-region that overlaps the first portion; and a second sub-region that overlaps the second portion, wherein a first modulated light from the first portion has a first brightness viewing angle, and a second modulated light from the second portion has a second brightness viewing angle, wherein the first brightness viewing angle is smaller than the second brightness viewing angle, wherein the second optical modulation layer has an equivalent thickness $T_m$ and an equivalent refractive index nm, and a width of the third region in a direction is $W_{Total}$, which conforms to the following relationship:

$$W_{Total} = 2 \times T_m \times \tan\left[\sin^{-1}\left(\frac{n_{air}}{n_m} \sin \theta_{spec}\right)\right]$$

wherein $\theta_{spec}$ is a side viewing angle of a user, and $n_{air}$ is the refractive index of air.

12. The electronic device as claimed in claim 11, wherein the control unit inputs a dark region voltage to the third region, so that a grayscale value of the third region is lower than 128.

13. The electronic device as claimed in claim 11, wherein the emitted light passes through the first portion to become the first modulated light, and the emitted light passes through the second portion to become the second modulated light.

14. The electronic device as claimed in claim 13, wherein a brightness viewing angle of the emitted light is larger than the first brightness viewing angle.

15. The electronic device as claimed in claim 13, wherein a brightness viewing angle of the emitted light is smaller than the second brightness viewing angle.

16. The electronic device as claimed in claim 11, wherein the emitted light from the first region passes through both the first portion and the second portion.

17. The electronic device as claimed in claim 11, wherein the emitted light from the first region and the second region has the same brightness viewing angle.

18. The electronic device as claimed in claim 11, wherein the panel overlaps the optical modulation layer, and the electronic device further comprises a backlight module disposed on a side of the panel opposite the optical modulation layer and providing light.

\* \* \* \* \*